United States Patent [19]
Aronica et al.

[11] Patent Number: 5,715,678
[45] Date of Patent: Feb. 10, 1998

[54] SYSTEM FOR MONITORING THE EFFICIENCY OF A CATALYSER, PARTICULARLY FOR MOTOR VEHICLES

[75] Inventors: Antonino Aronica, Turin; Claudio Carnevale, Nole Canavese; Marco Ciasullo, Turin, all of Italy

[73] Assignee: Magneti Marelli S.p.A., Milan, Italy

[21] Appl. No.: 564,872

[22] Filed: Nov. 28, 1995

[30] Foreign Application Priority Data

Nov. 30, 1994 [IT] Italy ................. TO94000980

[51] Int. Cl.$^6$ ........................................... F01N 3/28
[52] U.S. Cl. ........................ 60/276; 60/277; 73/118.1
[58] Field of Search ................. 60/276, 277; 73/118.1

[56] References Cited

U.S. PATENT DOCUMENTS

| | | | |
|---|---|---|---|
| 5,099,647 | 3/1992 | Hamburg | 60/277 |
| 5,228,335 | 7/1993 | Clemmens et al. | 73/118.1 |

FOREIGN PATENT DOCUMENTS

| | | |
|---|---|---|
| 0588123 | 3/1994 | European Pat. Off. . |
| 4243339 | 6/1993 | Germany . |

*Primary Examiner*—Douglas Hart
*Attorney, Agent, or Firm*—Sughrue, Mion, Zinn, Macpeak & Seas, PLLC

[57] ABSTRACT

The efficiency of a catalyser is evaluated starting from output signals of two lambda probes disposed upstream and downstream respectively of the catalyser. In particular, a signal obtained by calculating the difference between the time averages obtained by integration and subsequent division for the duration of an integration window of output signals of these probes is used as the signal indicative of efficiency.

13 Claims, 4 Drawing Sheets

5,715,678

SYSTEM FOR MONITORING THE EFFICIENCY OF A CATALYSER, PARTICULARLY FOR MOTOR VEHICLES

FIELD OF THE INVENTION

The present invention relates to systems for monitoring the efficiency of catalysers for the reduction of pollutant emissions of internal combustion engines, particularly petrol engines, on board motor vehicles. The present invention has been developed with particular attention to the need to satisfy the anti-pollution laws envisaged in the vehicle field, above all the laws which are about to be passed, generally known under the name OBD (On Board Diagnostic).

Legislation of this type began in 1988 with the OBD II laws promulgated in definitive form in 1991 by the C.A.R.B (California Air Resources Board) and the introduction into the state of California is envisaged starting from 1994. Further extensions of this legislation have been proposed in the United States by the EPA (Environment Protection Agency) and also at the European level under the current denomination of EOBD (European On Board Diagnostic).

The OBD II specification provides for the installation on motor vehicles of electronic systems able to periodically monitor the efficiency of the anti-pollution devices or, in general, to detect and signal the beginning of phenomena capable of producing an excessive increase in emissions by the vehicles.

Of the anti-pollution devices required to be monitored for the purpose of indicating malfunctioning in terms of exceeding the emission threshold measured on the homologation cycle (for example the so-called FTP'75 cycle) the main one is the catalyser positioned in the exhaust duct.

DESCRIPTION OF THE PRIOR ART

The solutions adopted up to now to monitor the conversion efficiency of the catalyser (for example within a so-called catalytic silencer) can be substantially reduced to two different basic approaches.

A first type of solution is based on the use of exhaust gas temperature sensors and aims to provide a measure of the efficiency of the catalyser on the basis of the temperature difference generated by the exothermic nature of the gas conversion process detected between positions upstream and downstream of the catalyser itself.

Solutions of the second type generally provide for the use of two sensors (so-called lambda probes) positioned respectively upstream and downstream of the catalyser.

It is then possible to obtain a comparison between the signals detected by the two lambda probes, respectively upstream and downstream of the catalyser, the respective variation of which is correlated, as will be seen more clearly hereinafter, with the conversion efficiency of the catalyser.

A system of this type is described for example in Italian Patent Application No. T092A000760, filed 14 Sep. 1992 in the name of Fiat Auto S.p.A. In particular, in the system described in this application, a signal obtained by calculating the variance of the output signals of these probes is utilised as the signal indicative of the efficiency. This system, although efficient, has however several disadvantages due, for example, to the wide variations in the excursions of the signals emitted by the lambda probes during the life of the catalyser.

OBJECTS AND SUMMARY OF THE PRESENT INVENTION

The solution according to the present invention is substantially based on the second type of solution described above and in particular has been developed starting from a system of the type described in the cited patent application No. T092A000760.

The problem on which the present invention is based is that of providing a system which on the one hand allows an effective diagnosis of the efficiency of the catalyser to be effected and at the same time has a high degree of reliability and precision, in such a way as to overcome the disadvantages of the prior art even in adverse environmental conditions such as are found on board motor vehicles.

According to the present invention this object is achieved by a system having the characteristics set out specifically in the following claims.

The invention will now be described, purely by way of non-limitative example, with reference to the attached drawings, in which:

FIG. 1 is a block schematic diagram illustrating the general circuit structure of a system according to the invention; and FIGS. 2 to 4 illustrate in more detail, in the form of block diagrams, the structure of portions of the system of FIG. 1.

DETAILED DESCRIPTION OF THE INVENTION

Figure 1:
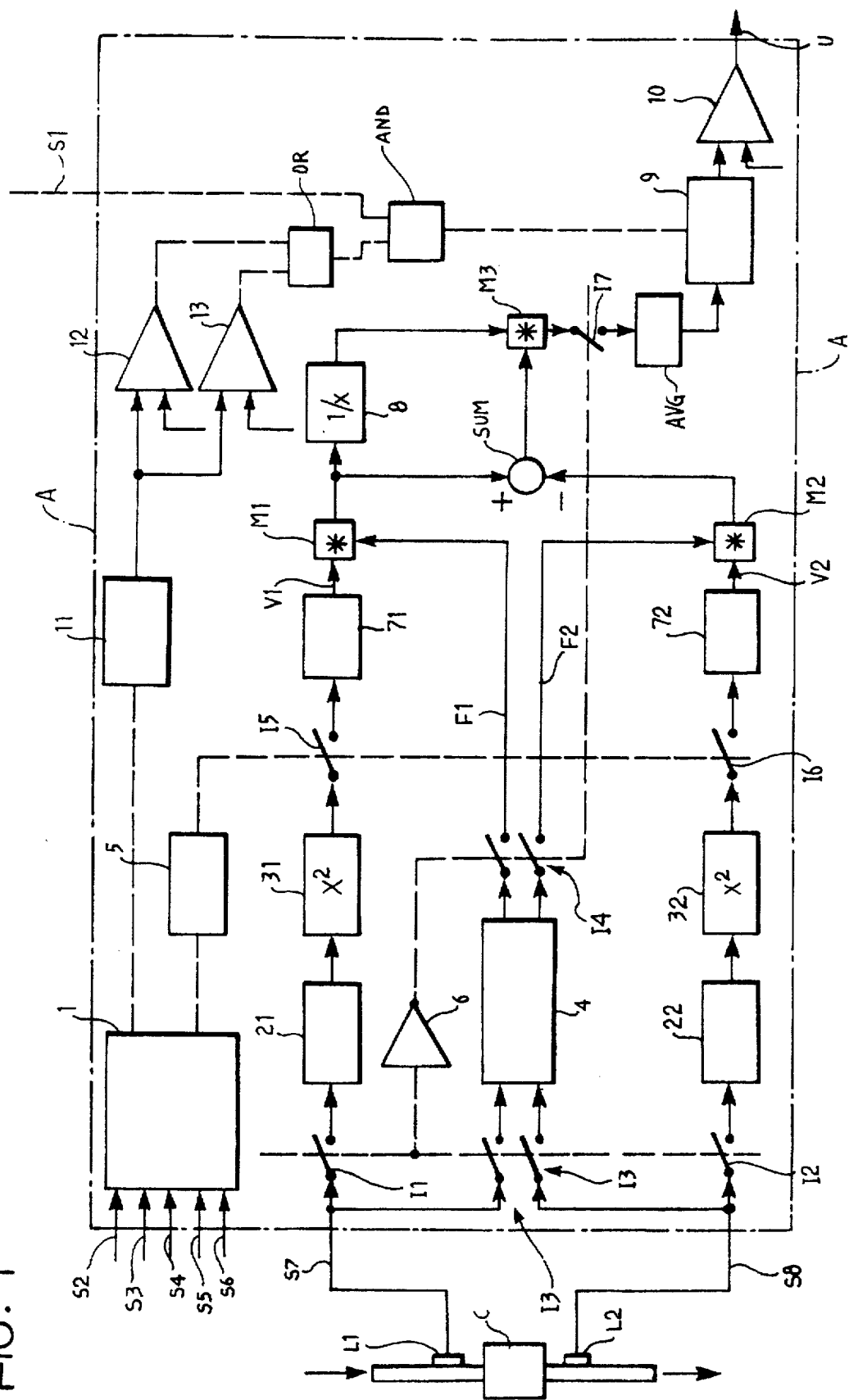

The system A according to the invention is intended to be connected at its input to two lambda probes L1 and L2 disposed upstream and downstream respectively of a catalyser C. In a typical embodiment of the invention this usually involves a so-called monolithic catalytic silencer C mounted on an exhaust pipe of a motor vehicle (not illustrated as a whole) driven by an internal combustion engine (not visible in the drawings) such as a petrol engine. More specifically, the lambda probe L1 positioned upstream of the catalyser C emits a signal S7 and the lambda probe L2 positioned downstream of the catalyser C emits a signal S8.

Naturally, the expressions "upstream" and "downstream" are related to the direction of the flow of gas within the exhaust pipe of the engine.

As well as signals S7, S8 generated by the two lambda probes L1, L2 (of type known per se) the system A is also sensitive to other selectively determinable parameters (in a variable manner or once and for all, for example upon calibration of the system), such as:

- a diagnostic threshold level signal S1 relating to the lambda probes L1, L2 (in particular relating to the upstream probe L1),
- an engine speed value signal S2,
- a signal S3 representing the value of the pressure detected in the induction manifold of the engine and/or the rate of flow of aspirated air in the manifold, indicating the torque generated by the engine (or the load to which the engine is subjected),
- a signal S4 representing the value of the detected temperature of the engine coolant liquid,
- a signal S5 indicative of the fuel mixture strength testing state;
- a signal S6 indicative of the slow running state of the engine.

Starting from the signals, and in dependence on the said parameters, the system A provides at its output U, to a display unit or warning device (such as a visible and/or acoustic warning device, a liquid crystal display) and/or to the input of a further processing system mounted on board the vehicle and/or again, possibly, to a system for the transmission of detected signals outside the vehicle itself (all not illustrated) at least one output signal indicative of the efficiency of the catalyser C.

The system A according to the invention lends itself to being formed by an electronic processor unit such as, for example, a microprocessor. The signals S7, S8 from the lambda probes L1, L2 are then applied to respective input modules/interfaces of such a processor unit in such a way as to condition them and to adapt them for subsequent processing. The other signals, on the other hand, that is to say the signals S1 to S6, constitute normal data input possibly programmable in a selective manner. The output line U usually corresponds to a normal interface output line adapted to control a display unit and/or a further processor/transmitter device which utilises the output signal from the system A.

The structure of the system A, illustrated hereinafter with specific reference to functional blocks, is naturally capable of being implemented at a programming level in the form of processor functions of the said electronic processor unit: all this is according to criteria widely known to the man skilled in the art, which does not therefore require to be illustrated herein in that it is in itself not relevant for the purposes of understanding the invention.

Signals S7, S8 from the lambda probes are sent, at the input of the system A, towards two parallel input channels having substantially the same structure. Each of these channels in fact comprises:

- a filtering module 21, 22 of the high pass type receiving at its input the signals S7, S8 coming from the two lambda probes L1, L2 respectively,
- a squaring module 31, 32 which receives at its input the output signal from the filtering module 21, 22,
- a time average calculating module 71, 72 in which is performed an operation of integration and a subsequent division by the duration of an integration window,
- a multiplication module M1, M2 in which the output of the time average calculation module 71, 72, indicated V1, V2 in the drawing, is multiplied by a scaling factor.

The structure of the system A will now be described in more detail, where necessary, with reference to the individual modules.

The modules 21, 22 employ digital filters of the infinite impulse response (IIR) type, to effect filtering of the signals S7, S8.

The system A includes, as already mentioned, a scale factor calculation module 4. In this module 4 the amplitude excursion of the signals S7, S8 coming from the two lambda probes L1, L2 are calculated. The reciprocal of the excursions identifies the scaling factors, indicated F1, F2 in the drawings. This module 4 will be described in more detail hereinafter.

The system A further includes a diagnosis activation module 1. This module 1 performs tests on the signals S2 to S6 and provides at its output a control signal which identifies the timing window (beginning and end points) in which the diagnosis operation is effected. This control signal commands two switches I1, I2 at the input of the filtering modules 21, 22, four switches I3, I4 positioned at the inputs and at the outputs of the scale factor calculation module 4 respectively and two switches I5, I6 positioned at the inputs of the time average calculation modules 71, 72. In practice the module 1 has the purpose of determining periods of stabilised (constant) operation of the engine within which it identifies the timing windows for calculation of the efficiency indices and as a consequence emits the said control signal. The activation module 1 will be described in detail hereinafter.

There is further provided a delay module 5 for delaying the control signal 9 which controls the switches I5, I6. The module 5 allows the time average calculation modules 71, 72 to be activated with a certain delay in such a way as to allow transients of the filtering modules 21, 22 to be excluded from the integration window. A negation module 6 serves on the other hand to invert the control signal operable to control the switches I4 positioned at the outputs of the scale factor calculation module 4 as well as a switch I7 which will be described hereinafter. This ensures that at the end of the integration window the scaling factors F1, F2 which have been calculated during the integration window (switches I3 closed) are sent to the multiplication modules M1, M2 by closure of the switches I4 caused by the negation module 6.

The outputs of the two multiplication modules M1, M2, that is to say in practice the outputs of the two channels leading to the two lambda probes L1, L2, are subtracted from one another in a summing module SUM. More specifically the output of the multiplication module M2 (downstream probe L2) is subtracted from the output of the multiplication module M1 (upstream probe L1). The output of the summing module SUM is sent to a multiplication module M3 in which it is multiplied by the output of a reciprocal calculation module 8. This module 8 receives at its input the output from the multiplication module M1 so that the output of the summing module SUM is multiplied by the reciprocal of the output of the multiplication module M1.

The output of the multiplication module M3 is sent to a mean calculation module AVG. This module, which is substantially constituted by a summer or integrator forms the mean of the output signals emitted by the multiplication module M3 during one journey or trip of the motor vehicle. In substance the module AVG calculates an efficiency index, hereinafter called $I_{trip}$ and for simplicity, relating to the most recent journey of the motor vehicle, that is to say relating to the time interval lying between the last times that the motor vehicle engine was switched on and off. The switch I7 mentioned above is positioned at the input of the module AVG so that it in practice controls the generation of a new $I_{trip}$ index by the module AVG.

This efficiency index $I_{trip}$ is sent to a filtering module 9. This module 9 filters the $I_{trip}$ index each time a control signal coming from an AND module, which is constituted by a logic and gate, assumes a predetermined logic value representing activation, or rather when the conditions exist which allow the diagnosis operation to be terminated. The output of this filtering module 9 is indicative of the efficiency of the catalyser C. The filtering module 9 will be described in more detail hereinafter.

At the output of the module 9 is a threshold comparator module 10. This module 10 compares the output of the filtering module 9 with a predetermined threshold to generate, at the output U of the system, a logic signal indicative of the state of efficiency (or otherwise) of the catalyser C.

The system A further includes a counter module 11 having an input connected to one output of the activation module 1. This counter module 11 counts the overall time of the test period during which the signals from the two lambda probes L1, L2 are under examination. In practice the module 11 has the function of enabling the calculation of an $I_{trip}$ index when the overall duration of the intervals during which the engine speed is stabilised exceed a predetermined threshold. To this end the module 11 emits at its output a signal indicative of this overall duration which is sent to a first comparator module 12. Only if a said overall duration exceeds the predetermined threshold value does the output of the first comparator module 12 enable the calculation of an $I_{rip}$ index. In practice, when the motor vehicle engine is turned off, if this overall duration is sufficient the efficiency index $I_{rip}$ is calculated, whereas if this overall duration is insufficient the $I_{rip}$ index is not calculated.

Moreover, the calculation of an $I_{rip}$ index is also enabled if the said overall duration exceeds a second predetermined threshold value. For this purpose the output of the counter module 11 is also sent to a second threshold comparator module 13. The outputs of the comparator modules 12 and 13 are both connected to the inputs of a logic or gate described hereinafter, so that both can activate the calculation of a new efficiency index. In the case of the module 12, however, this starts, only after the reception of a signal (not illustrated) indicating that the engine has been turned off, whilst the signal from the module 13 activates the calculation immediately.

Naturally, the counter module 11 is zeroed by the said signal indicating that the engine has been turned off. This also has the purpose of ensuring that only one $I_{rip}$ index is calculated for each journey.

The outputs of the comparator modules 12 and 13 are connected to the inputs of an OR module which is constituted by a logic or gate. The output of the OR module is connected to one input of an AND module which is constituted by a logic and gate. The other input of the AND module is the above-mentioned activation signal S1 and its output is connected to the filtering module 9 to enable generation of an output signal indicative of the efficiency of the catalyser C.

The signal S1 is therefore, in effect, an enablement signal which enables diagnosis in that it permits the calculation of the efficiency index. As mentioned above, the signal S1 comes from a lambda probe diagnosis circuit (upstream and downstream of the catalyser C).

In this way, upon arrival from the OR module of the efficiency index calculation enablement signal produced by the comparator module 12 or 13, the AND module if the signal S1 is active emits a control signal which enables calculation of a new $I_{rip}$ index by the average calculation module AVG, and the calculation of a new efficiency index, at the output from the system A, by the filtering module 9.

Figure 2:
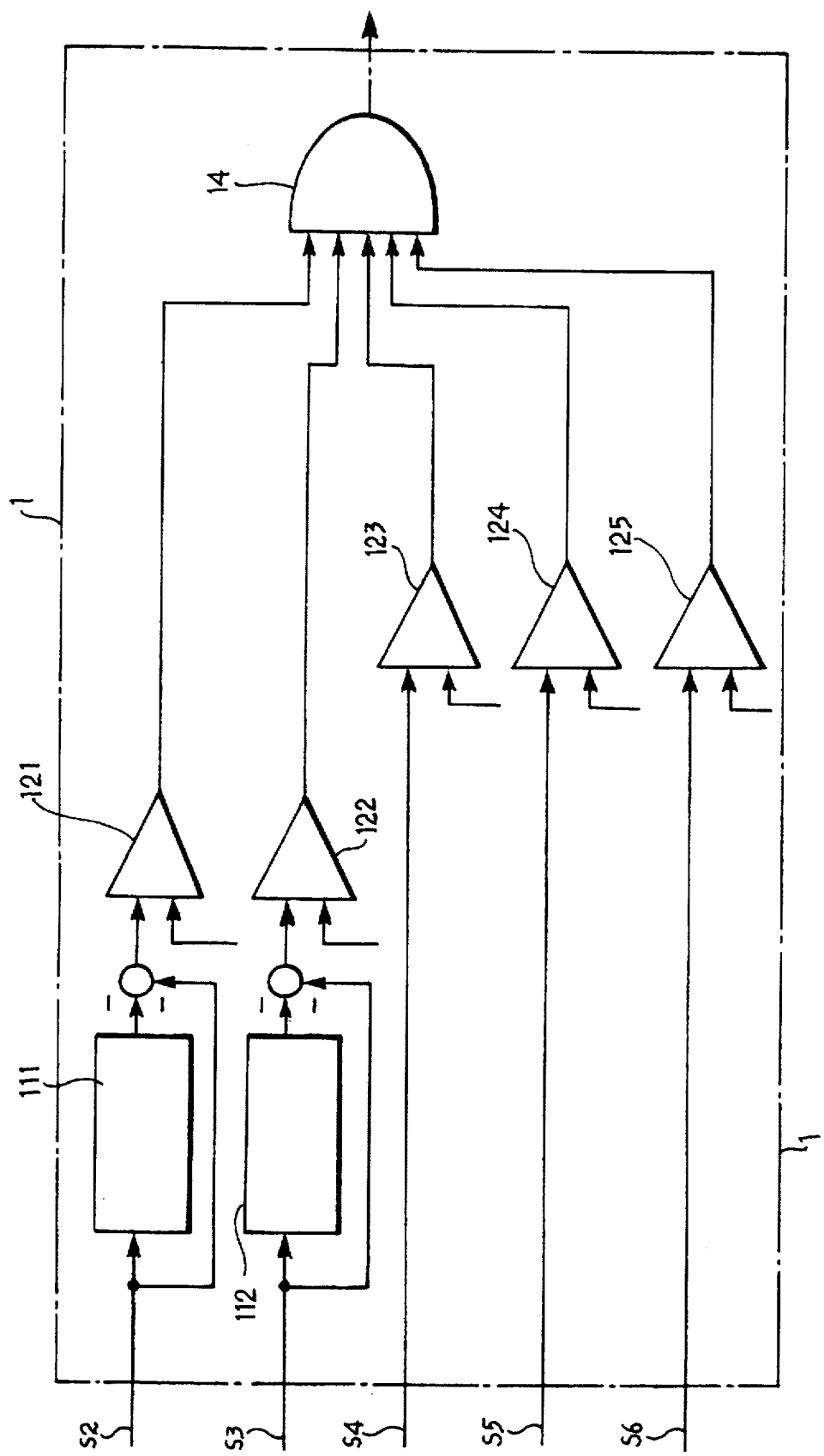

The activation module 1 will now be described in more detail, with reference to FIG. 2. More specifically, this module 1 has a plurality of inputs for signals S2, S3, S4, S5, S6. As has been mentioned, in order that the diagnosis operation can take place predetermined conditions on the said signals S2 to S6 must be satisfied. For this reason the signals S2 to S6 must be treated in such a way as to be connected into logic signals.

The signals S2 and S3 are pre-treated by means of two filtering modules 111, 112 of low-pass type. More precisely, the non-filtered signals S2, S3 are summed with the outputs of the modules 111, 112, that is to say the filtered signals S2, S3 respectively. In practice, the signals S2, S3 are first filtered and subsequently a test is made on the difference between the filtered and non-filtered signals. In this way a test indicative of the stabilisation of the engine is performed in such a way as to activate the diagnosis only in an interval when the engine is stabilised. The filters 111, 112 and the thresholds are calibrated in such a way as to stabilised the oscillations of the lambda probe 1 upstream of the catalyser C.

Subsequently all the signals S2 to S6, that is to say the signals S2 and S3 treated by means of the modules 111 and 112, and the signals S4, S5 and S6, are converted into logic signals by means of corresponding threshold comparator modules 121, 122, 123, 124, 125 having predetermined thresholds.

The outputs of all the threshold comparator modules 121 to 125 constitute the inputs of a logic gate 14 the output from which is the output of the activation module 1. The logic gate 14 performs a five inputs logic function.

Figure 3:
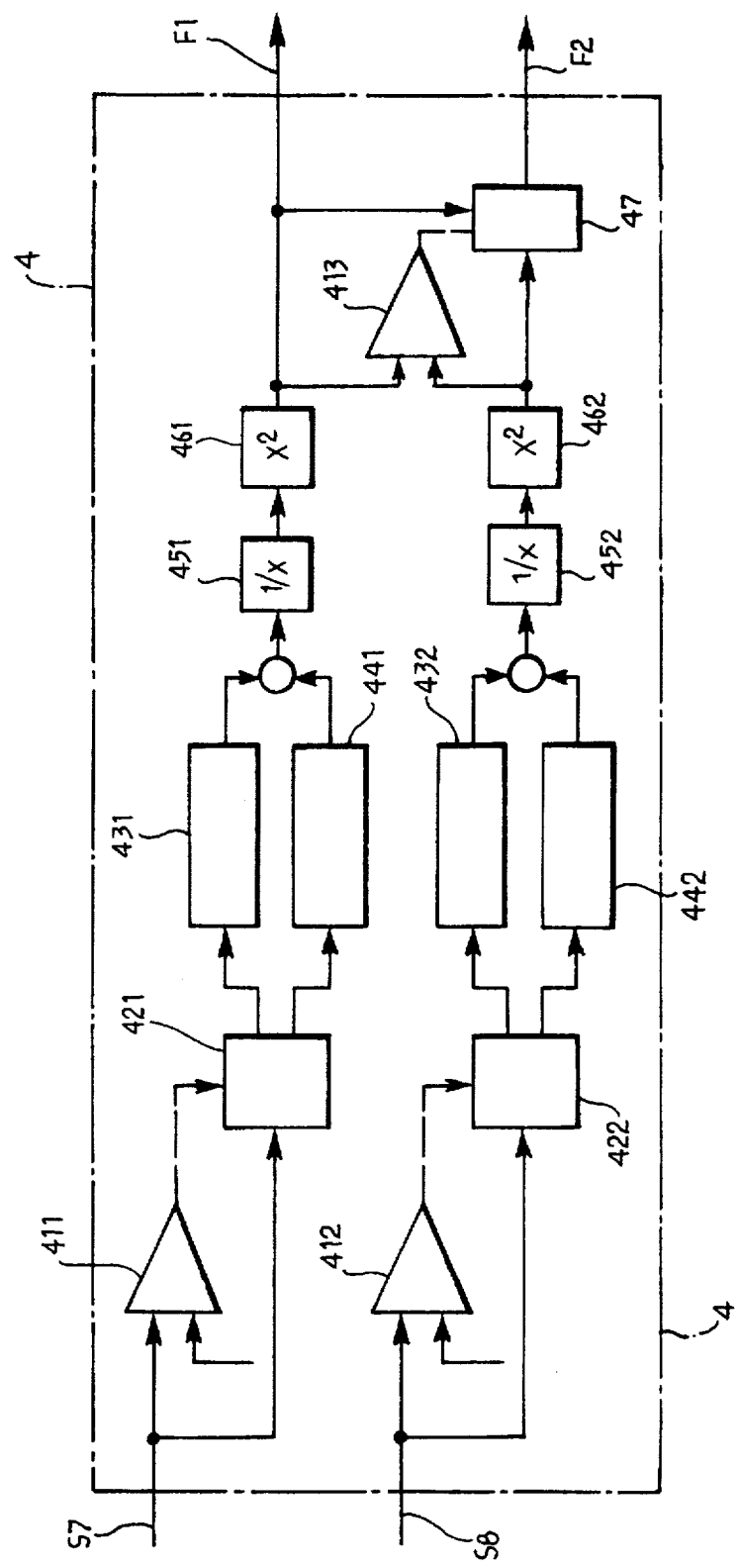

The module 4 will now be described in more detail with reference to FIG. 3. The inputs of this module are the two signals S7, S8 coming from the two lambda probes L1, L2. These signals S7, S8 are provided as inputs to two threshold comparator modules 411, 412 having predetermined thresholds, and two demultiplexer modules 421, 422. Depending on the output of the threshold comparator modules 411, 412 the demultiplexer modules 421, 422 send the signals S7, S8 to two maximum-value calculation modules 431, 432 or to two minimum-value calculation modules 441, 442.

The outputs of the maximum value calculation modules 431, 432 are summed with the outputs of the associated minimum value calculation modules 441, 442 (changed in sign) and the results of these sums are sent to two reciprocal calculation modules 451, 452.

The outputs of the reciprocal calculation modules 451, 452 are sent to squaring modules 461, 462. The outputs of these modules 461, 462 are in practice the calculated scaling factors for the two channels of the system. However, in normal conditions, only one of the two calculated scaling factors is sent to the outputs F1, F2 of the module 4, constituting the scaling factors employed by the system. The outputs of the squaring modules 461, 462 are in fact connected to a threshold comparator module 413 which in turn controls a multiplexer module 47 the output of which is connected to the output F2 of the module 4 and the two inputs of which are connected to the outputs of the modules 461, 462. If the output of the module 461, corresponding to the upstream lambda probe L1 is less than the output of module 462, as is normal, then it is sent to both the outputs F1, F2 of the module 4. In the opposite case the output of the module 462 corresponding to the downstream lambda probe L2 is sent to the output F2.

Figure 4:
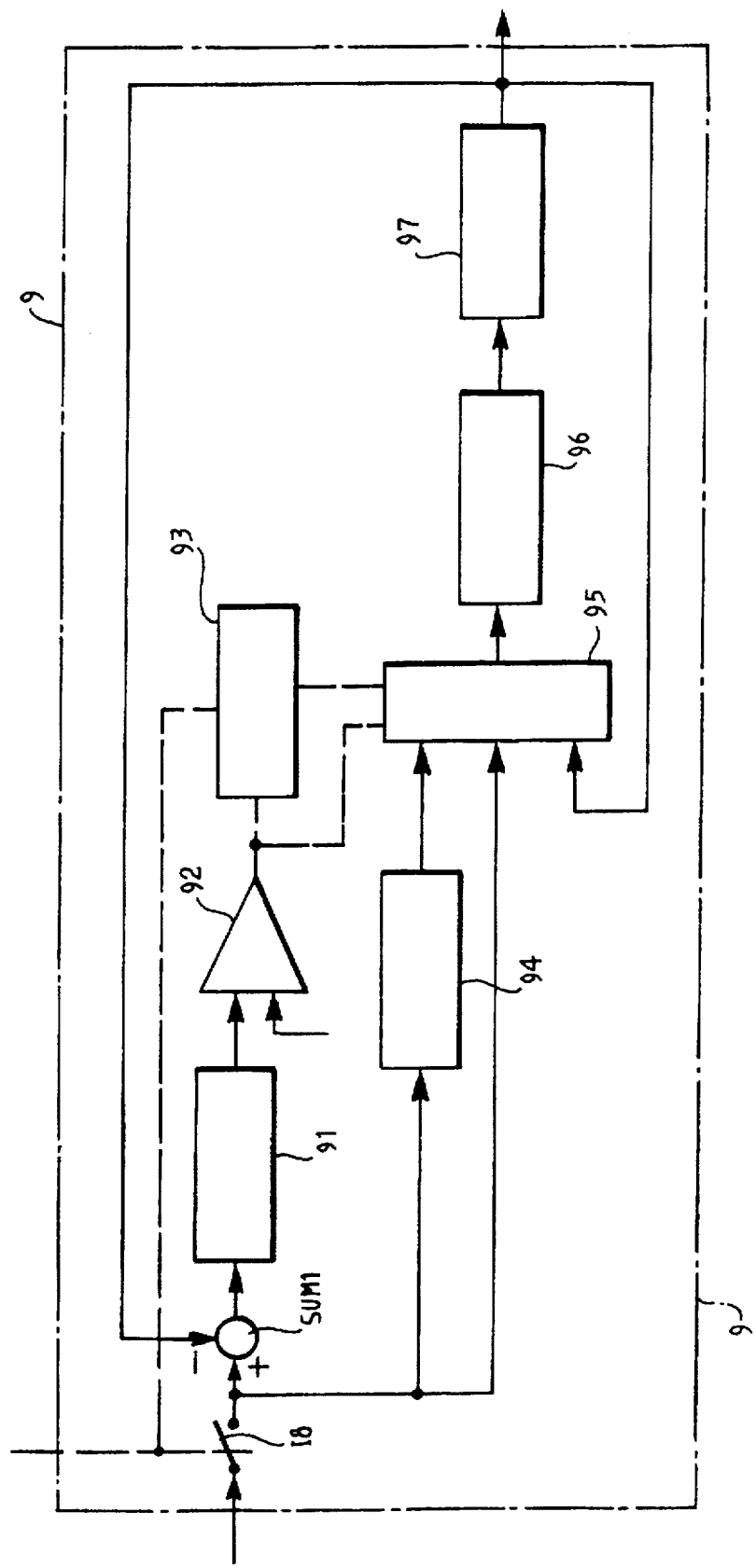

The module 9 will now be described in greater detail with reference to FIG. 4. As already mentioned, the module 9 is controlled, via a switch I8 at its input, by the control signal emitted by the AND module. The module 9 includes an absolute value calculation module 91. This module 91 provides the absolute value of the difference, calculated in a summing module SUM1, between an input signal at the module 9 and an output signal of the module 9, that is to say the signal emitted by a module 97 which will be described hereinafter. The output of the module 91 is connected to the input of a threshold comparator module 92. The output of the threshold comparator module 92, having a predetermined threshold, is in turn connected to the input of a counter module 93.

This counter module 93 is timed by the control signal coming from the AND module described hereinabove, and is reset by the signal from the comparator module 92. When this counter module 93 reaches a count equal to 2 it emits at its output a logic signal which enables a first input of a multiplexer module 95.

A memory module 94 is connected to the input of the module 9 in parallel with the module SUM1. This memory module 94 is a two-element register which stores the last two input values of the module 9.

The previously-mentioned module 95 is a multiplexer. It has three inputs, a first input from the module 94, a second input connected to the input of the module 9 and a third input connected to the output of the module 9. The combination of control signals coming from modules 92 and 93 enables one of the three inputs according to the following scheme:

```
92 = 0    93 = 0    enabled input = third
92 = 1    93 = 0    enabled input = second
92 = 1    93 = 1    enabled input = first
```

The output of the module 93 is never equal to 1 when the output of the module 92 is equal to 0.

To the output of the multiplexer module 95 is connected a memory module 96. The memory module 96 is in practice a five element shift register. The values in the shift register 96 are controlled by the module 95. The output of the shift register 96 is connected to an average-value calculation module 97. The module 97 calculates the average of the values contained in the shift register 96.

In practice, the main function of the module 9 is to average the last five values received at the input so as to effect a filtering of the moving-average type. The values which the module 9 receives at its input, as has been seen, are the $I_{trip}$ indices so that the output is an average of the last five $I_{trip}$ indices, in practice this is therefore a filtered index of the efficiency of the catalyser C, and is in substance the output of the system A.

To this main function must, however, be added the auxiliary functions for the purpose of respecting the previously mentioned anti-pollution regulations. These regulations require that the indication of a deterioration in the efficiency of the catalyser C take place after a reduced number of journeys. For this reason the last $I_{trip}$ index is compared, in the module 92, with the preceding filtered efficiency index. If the difference between the two is high the anomalous $I_{trip}$ index is stored in the module 94 and the counter 93, which counts module 2, goes to 1.

In this case, that is to say the first time that an anomalous $I_{trip}$ index is received, this is not introduced into the moving average which, on the other hand, uses in its place the preceding value of the efficiency index, in practice replicating the preceding value. If the subsequent $I_{trip}$ index is normal all is reinstated to the normal operation, discarding the anomalous value of the $I_{trip}$ index.

If, on the other hand, the subsequent $I_{trip}$ index is also anomalous the counter module 93 connects the first input to the average calculation module 96 via the multiplexer 95, and arranges that the calculated average relates solely to these two anomalous values. The subsequent averages are therefore of three, four and then five values. In this way it is ensured that possible operating anomalies appear in the filtered efficiency values by the second value.

The module 9 naturally, as is seen, is activated by the enablement signal emitted by the AND module which also causes calculation of the new $I_{trip}$ index. Upon reception of this signal and of the new $I_{trip}$ index in the module 9 the said operations are then performed.

The system A according to the invention described here is based on the theory, known in the literature, according to which a catalyser, once deteriorated, is reduced in its oxygen storage capacity in which oxygen derived from the NOx reduction reactions is retained within the monolith to develop simultaneously the HC and CO oxidation reactions.

The progressive loss of this capacity, due to the multiple causes of ageing, gradually results in the alteration of the normal characteristic of the catalyser C to reduce the amplitude of the oscillations of the strength (detectable with the lambda probe L1) upstream of the catalyser C; these variations tend thus increasingly to be repeated also downstream of the catalyser C because of the more rapid release of oxygen no longer retained by the catalyser C itself.

The solution according to the invention envisages the provision of an index of the capacity of the signal from the lambda probe L2 downstream of the catalyser C to follow the behaviour of the upstream lambda probe L1 thereby deriving a measure of the loss of efficiency by the catalyser C positioned between the two probes L1, L2.

The $I_{trip}$ indices are therefore calculated substantially on the basis of the following formula:

$$(V1*F1 - V2*F2)/(V1*F1)$$

where V1*F1 and V2*F2 are values V1 and V2 at the output from the two channels of the system A multiplied by the scaling factors F1 and F2 in the multiplication modules M1, M2. Since, as is seen, the scaling factor F2 normally coincides in reality with the scaling factor F1 the preceding formula simplifies to:

$$(V1=V2)/V1$$

which is a ratio indicative exactly of the efficiency of the catalyser C.

In the case, however, of an anomaly for which the scaling factor F2 is less than the scaling factor F1, and therefore not replaced by it, the said ratio can assume a negative value.

Naturally, the principle of the invention remaining the same, the details of construction and the embodiments can be widely varied with respect to what has been described and illustrated, without by this departing from the ambit of the present invention.

What is claimed is:

1. A system for detecting the degree of efficiency of a catalyser intended to be traversed by a flow of gas, comprising at least two sensors such as lambda probes located, in use, respectively upstream and downstream of said catalyser in the direction of flow of said gas and capable of generating respective output signals, wherein it comprises:
   first calculation means for performing a high-pass filtering of each of said respective output signals,
   second calculation means for calculating a time average for each signal by means of an integration operation and a subsequent division for the duration of an integration window of said filtered output signals, respectively,
   first multiplication means for multiplying each said time average by scaling factors indicative of the excursions of said output signals,
   third calculation means for calculating a difference between said time averages multiplied by said scaling factors so as to generate a deviation signal between said time averages, and
   fourth calculation means for calculating, starting from said deviation signal, an output signal indicative of the efficiency of said catalyser.

2. A system according to claim 1, wherein it includes moving-average calculation means operating on the said output signal indicative of the efficiency of the said catalyser in order to calculate a journey efficiency index of the said catalyser relating to a period of use of a vehicle to which the said catalyser is fitted.

3. A system according to claim 2, wherein it includes filtering means operating on the said journey efficiency index for calculating a current efficiency index of the said catalyser at the end of the said period of use of the said vehicle.

4. A system according to claim 3, wherein it includes means for monitoring the period of use operatively connected to the said moving-average calculation means and to the said filtering means, operable to calculate a new journey efficiency index and a new current efficiency index at the end of the said period of use when a useable duration of the said period of use exceeds a first predetermined threshold value.

5. A system according to claim 4, wherein
the said means for monitoring the use period include detection means operatively connected to sensor means associated with a heat engine of the said vehicle and the exhaust system of which is provided with the said catalyser, operable to identify time intervals in which the said engine has stable operating conditions constituting the said useable duration of the said use period, capable of allowing the said calculation of the said output signal indicative of the efficiency of the said catalyser to be performed.

6. A system according to claim 5, wherein the said useable period monitoring means include counter means operatively connected to the said detection means configured in such a way as to count the overall duration of the said stable operating condition time intervals starting from the ignition of the said engine until it is turned off.

7. A system according to claim 4, wherein the said useable period monitoring means are operable to cause calculation of a new journey efficiency index and a new current efficiency index during the said use period when the said useable duration of the said use period exceeds a second predetermined threshold value.

8. A system according to claim 1, wherein the said fourth calculation means include means for calculating the reciprocal of one of the said time averages and multiplication means for multiplying the said reciprocal by the said difference.

9. A system according to claim 3, wherein the said filtering means are configured to perform a filtering of the moving-average type.

10. A system according to claim 4, wherein the said filtering means are configured to:

compare the said new journey efficiency index with a preceding current efficiency index before performing the calculation of the said new current efficiency index, temporary storage of the said new journey efficiency index if it is different from the said previous current efficiency index by more than a predetermined threshold value, performing the said calculation of the said new current efficiency index by means of a moving average filtering, neglecting the said new journey efficiency index.

11. A system according to claim 10, wherein the said filtering means are configured to perform the said calculation of the said new current efficiency index by means of the said moving-average filtering if the said new journey efficiency index and a temporarily stored previous journey efficiency index, both differ from the said previous current efficiency index by more than the said predetermined threshold value, using only the said new journey efficiency index and the said temporarily stored previous journey efficiency index.

12. A system according to claim 3, wherein it includes comparator means connected to an output of the said system operable to compare the said current efficiency index with a predetermined threshold value to emit at its output a logic signal indicative of the efficiency of the said catalyser.

13. A system according to claim 1, wherein it includes means for calculating the said scaling factory configured to:

calculate a respective scaling factor for each of the said output signals generated by the said sensors located upstream and downstream respectively of the said catalyser, compare the said scaling factors with one another, substitute a first scaling factor corresponding to the said upstream located sensor, for a second scaling factor corresponding to the said downstream located sensor, if the said first scaling factor is less than the said scaling factor.

* * * * *